March 27, 1951 — B. D. HABER ET AL — 2,546,155

DEFLECTION INDICATOR

Filed Sept. 3, 1947

INVENTORS
BERNARD D. HABER
EDWARD K. COATS
BY
ATTORNEYS

Patented Mar. 27, 1951

2,546,155

UNITED STATES PATENT OFFICE 2,546,155

DEFLECTION INDICATOR

Bernard D. Haber, Dayton, and Edward K. Coats, Xenia, Ohio

Application September 3, 1947, Serial No. 771,956

2 Claims. (Cl. 33—139)

(Granted under the act of March 3, 1883, as amended April 30, 1928; 370 O. G. 757)

The invention described herein may be manufactured and used by or for the Government for governmental purposes without payment to us of any royalty thereon.

This invention relates to a deflection indicator for electrically measuring the deflection undergone by structural members under stress.

One object of the invention is to provide an indicator of the class described which is especially adapted to dynamic stress measurement although the deflection due to both static and dynamic loads may be measured with it.

Another object is to provide an indicator which is a self contained unit except for the necessary current supplying and reading devices.

Another object is to provide an indicator that will accurately measure large deflections.

Figure 1:
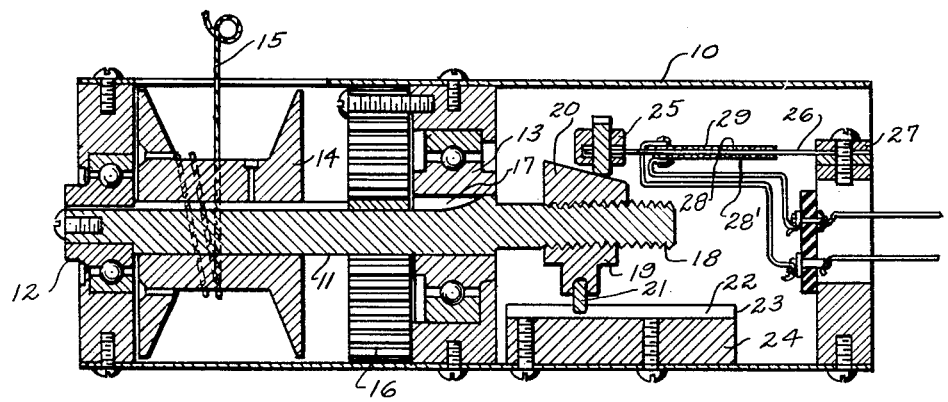
Fig. 1 is a longitudinal cross section of our device showing no deflection.

The indicator comprises a preferably cylindrical casing 10. Within the casing 10 is centrally mounted a shaft 11 in ball bearings 12 and 13. A spool 14 is tightly attached to the shaft 11 and carries a light cable 15. The latter is intended to be attached to the structural member undergoing deflection test; the indicator being clamped to some stationary base.

Encircling the shaft 11, there is a clock-type spring 16, the outer end of which is tightly attached to the inner surface of the casing 10, the inner end being tightly attached to the shaft 11. It is evident, therefore, that upon rotation of the shaft 11 in a clockwise direction, judged from the left end of the device, the spring 16 will be tightened as cable 15 unwinds from the spool 14, thereby keeping the cable taut. A keyway 17 is provided in shaft 11 for the attachment of the end of the spring 16.

Figure 2:
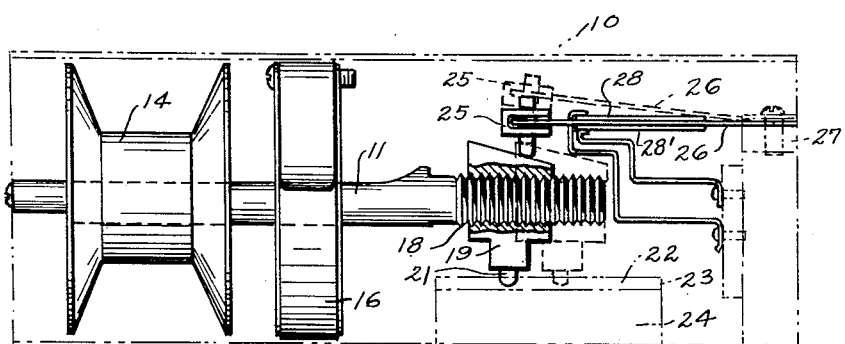
Fig. 2 is a corresponding view, except the parts are not sectioned; deflection is being registered when the strain gauge which is incorporated, occupies the position shown in dashed lines.
Figure 3:
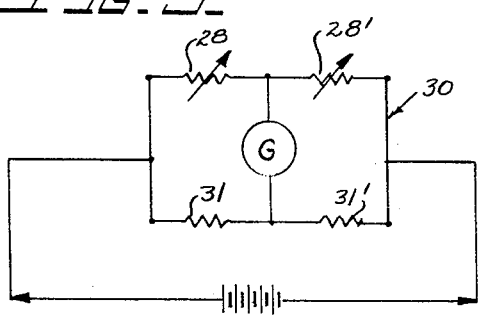
Fig. 3 is a schematic diagram of the electric circuit incorporated in the device.

Shaft 11 at its right end bears a threaded portion 18. Threadedly engaged with portion 18 is a cam or beveled nut 19, the surface 20 of which slants forwardly. On the lower side of nut 19 there is a key 21 which engages a keyway 22. The latter is cut into a plate 23 which is held by screws to a bed 24. Rotation of the shaft 11 therefore advances or retards the nut 19 depending upon the direction in which shaft 11 is rotated. The beveled surface 20 engages a spring finger 25. The latter comprises a spring arm 26 or beam which is a flat spring-tempered strip, firmly enclosed at one end by an anchorage 27. Upon each flat surface of the strip 26 there is adhesively attached a W-shaped loop of resistance wire (not shown in Figs. 1 and 2). Each such loop 28 or 28' (see Fig. 3) constitutes a variable resistor adapted to act as a strain gage. In practice, each loop 28 is covered with a felt pad 29 and is connected into an electric circuit 30. Bending of the spring 26 stretches strain gage 28', thereby thinning the wire and thus increasing the resistance of the gage, and compresses strain gage 28 decreasing its resistance. The strain gages 28 and 28' are connected in adjacent arms of a bridge circuit 30, two arms of which include the known resistances 31 and 31'. The values of the changing potential may be read from a meter G which is connected across the arms of the bridge.

In use, the indicator is first calibrated by measuring the signals corresponding to known deflections.

It is not necessary to employ two strain gages 28 and 28'. Only one may be sufficient, but two are preferably employed because an amplified signal then results.

We claim as our invention:

1. A device for measuring and remotely indicating the local deflection of a large structure such as an aircraft wing under static loading comprising a casing, a shaft journalled for rotation in said casing, a reel mounted on said shaft, a cord wound on said reel and adapted to have its free end connected to the structure at the point where the deflection is to be measured, rotation of said reel by the cord rotating the shaft an amount proportional to the deflection to be measured, a screw formed on said shaft, means engaging said screw and adapted to be axially displaced by rotation of the screw said means including a cam, a beam member mounted in said casing and engaging said cam to be deflected thereby in proportion to rotation of said shaft and screw, a resistance type strain gauge mounted on said beam member, and electrical indicating means including a bridge circuit connected to said strain gauge and adapted to indicate at a remote point the change in resistance of said strain gauge in terms of the deflection to be measured.

2. A measuring device for displacement which comprises a casing, a shaft within said casing, said shaft being adapted to be rotated in accordance with the displacement to be measured, a nut having a cam surface thereon threadedly engaging a portion of a shaft, key and keyway means positioned between the nut and the casing for preventing rotation of the nut, a beam comprising a spring strip attached by one of its ends to said casing, a strain gauge mounted upon said beam, the beam being adapted to be engaged and deflected by the cam portion of said nut whereby to deflect said strain gauge, an electric bridge circuit having arms including known resistances in a plurality of the arms of said bridge, said strain gauge being connected into one of said arms and an electric indicating means for indicating variation in bridge unbalance as a measure of strain gauge deflection.

BERNARD D. HABER.
EDWARD K. COATS.

REFERENCES CITED

The following references are of record in the file of this patent:

UNITED STATES PATENTS

| Number | Name | Date |
|---|---|---|
| 475,630 | Stull | May 24, 1892 |
| 692,756 | Baldwin | Feb. 4, 1902 |
| 827,182 | Rittmeyer | July 31, 1906 |
| 2,144,746 | Thorpe | Jan. 24, 1939 |
| 2,321,322 | Ruge | June 8, 1943 |

OTHER REFERENCES

Gunning and Van Leeuwen, "Resistance Wire Strain Gage Equipment, etc.," Product Engineering, Sept. 1945, pp. 608–613.

"Clarkator," Clark Instrument Co., Dearborn, Mich., 4 pages.